United States Patent
Bussi et al.

(10) Patent No.: US 11,377,520 B2
(45) Date of Patent: Jul. 5, 2022

(54) USE OF PEKK FOR PRODUCING PARTS WITH LOW GAS PERMEABILITY

(71) Applicant: Arkema France, Colombes (FR)

(72) Inventors: Philippe Bussi, Colombes (FR); Benoît Brule, Serquigny (FR); Clément Paul, Serquigny (FR)

(73) Assignee: ARKEMA FRANCE, Colombes (FR)

( * ) Notice: Subject to any disclaimer, the term of this patent is extended or adjusted under 35 U.S.C. 154(b) by 208 days.

(21) Appl. No.: 16/766,360

(22) PCT Filed: Nov. 27, 2018

(86) PCT No.: PCT/FR2018/053001
§ 371 (c)(1),
(2) Date: May 22, 2020

(87) PCT Pub. No.: WO2019/102165
PCT Pub. Date: May 31, 2019

(65) Prior Publication Data
US 2020/0377654 A1 Dec. 3, 2020

(30) Foreign Application Priority Data
Nov. 27, 2017 (FR) ...................... 1761241

(51) Int. Cl.
| | |
|---|---|
| *F16L 11/14* | (2006.01) |
| *C08G 65/40* | (2006.01) |
| *B32B 1/08* | (2006.01) |
| *B32B 15/08* | (2006.01) |
| *B32B 27/08* | (2006.01) |
| *B32B 27/12* | (2006.01) |
| *C08J 5/04* | (2006.01) |
| *F16L 58/10* | (2006.01) |
| *B29C 48/00* | (2019.01) |
| *B29C 63/00* | (2006.01) |
| *B29D 23/00* | (2006.01) |
| *F16L 9/12* | (2006.01) |
| *F16L 9/147* | (2006.01) |
| *F16L 58/02* | (2006.01) |
| *B29K 71/00* | (2006.01) |
| *B29K 271/00* | (2006.01) |
| *B29L 23/00* | (2006.01) |

(52) U.S. Cl.
CPC ...... *C08G 65/4012* (2013.01); *B29C 48/0015* (2019.02); *B29C 63/0017* (2013.01); *B29D 23/001* (2013.01); *B32B 1/08* (2013.01); *B32B 15/08* (2013.01); *B32B 27/08* (2013.01); *B32B 27/12* (2013.01); *C08J 5/042* (2013.01); *F16L 9/12* (2013.01); *F16L 9/147* (2013.01); *F16L 11/14* (2013.01); *F16L 58/02* (2013.01); *F16L 58/1045* (2013.01); *B29K 2071/00* (2013.01); *B29K 2271/00* (2013.01); *B29K 2995/0065* (2013.01); *B29K 2995/0067* (2013.01); *B29L 2023/005* (2013.01); *C08G 2650/40* (2013.01)

(58) Field of Classification Search
CPC ..... C08G 65/4012; B29D 23/001; F16L 9/12; F16L 9/147; F16L 11/14; F16L 58/02; F16L 58/1045
USPC ....... 138/137, 141, 140, 135, 136; 428/36.1, 428/36.91
See application file for complete search history.

(56) References Cited

U.S. PATENT DOCUMENTS

| | | | |
|---|---|---|---|
| 8,129,462 B2 | 3/2012 | Hsu et al. | |
| 8,163,364 B2 | 4/2012 | Braad et al. | |
| 9,562,879 B2* | 2/2017 | Hirmer | G01N 30/60 |
| 2006/0229395 A1 | 10/2006 | Hsu et al. | |
| 2007/0036925 A1 | 2/2007 | Braad | |

(Continued)

FOREIGN PATENT DOCUMENTS

| | | |
|---|---|---|
| FR | 3007033 A1 | 12/2014 |
| FR | 3046208 A1 | 6/2017 |
| WO | 2012107753 A1 | 8/2012 |
| WO | 2014199033 A1 | 12/2014 |

OTHER PUBLICATIONS

International Search Report (PCT/ISA/210) and translation and Written Opinion (PCT/ISA/237) dated Feb. 19, 2019, by the European Patent Office as the International Searching Authority for International Application No. PCT/FR2018/053001.
Office Action (Notification of the First Office Action) dated Dec. 23, 2022, by the China National Intellectual Property Administration in corresponding Chinese Patent Application No. 201880076705.8, and an English Translation of the Office Action. (14 pages).

*Primary Examiner* — Patrick F Brinson
(74) *Attorney, Agent, or Firm* — Buchanan Ingersoll & Rooney P.C.

(57) ABSTRACT

The use of PEKK for lowering the $CO_2$ and $H_2S$ permeability of a part intended to enter into contact with a petroleum effluent. Also, a pipe for transporting a petroleum effluent, including a layer intended to be in contact with the petroleum effluent, wherein the layer intended to be in contact with the petroleum effluent comprises PEKK and has a $CO_2$ permeability at 130° C. of less than $10^{-8}$ cm$^3$, for a thickness of 1 cm and a surface area of 1 cm$^2$ and per second and bar of $CO_2$ pressure and/or an $H_2S$ permeability at 130° C. of less than $10^{-8}$ cm$^3$ for a thickness of 1 cm and a surface area of 1 cm$^2$ and per second and bar of $H_2S$ pressure, the amount of $CO_2$ and $H_2S$ being measured by GC, respectively. Lastly, a number of methods for manufacturing such a pipe.

18 Claims, No Drawings

(56) References Cited

U.S. PATENT DOCUMENTS

| | | | | |
|---|---|---|---|---|
| 2013/0112308 A1* | 5/2013 | Glejbol | ................ | F16L 11/083 |
| | | | | 138/137 |
| 2016/0069503 A1* | 3/2016 | Messina | ................ | B32B 15/08 |
| | | | | 156/196 |
| 2017/0254446 A1* | 9/2017 | Glejbøl | ................ | B32B 27/286 |

* cited by examiner

USE OF PEKK FOR PRODUCING PARTS WITH LOW GAS PERMEABILITY

TECHNICAL FIELD

The present invention pertains to the use of poly(etherketoneketone) (PEKK) as gas barrier layer, and especially for manufacturing parts which have a low permeability to gases such as $CO_2$ or $H_2S$. It pertains more particularly to pipes which are used for transporting petroleum fluids.

TECHNOLOGICAL BACKGROUND

There are numerous sectors which require materials having a low gas permeability, even under severe conditions.

For instance, in offshore petroleum extraction, the extracted hydrocarbons have to be transported over long distances and under extreme conditions. This is because the pipes which are used may be subject to pressures exceeding 100 bar and to high temperatures of more than 90° C. or even 130° C. for a prolonged duration. During transport of the petroleum effluent under these conditions, certain gaseous acidic compounds which are present in the hydrocarbons transported, such as $H_2S$ and $CO_2$, may give rise to very expensive corrosion damage if they reach metal components. Corrosion presents a serious risk because of the substantial stresses on the pipes not only from their weight but also from the high pressure of the petroleum effluent and the offshore environment. The phenomena of migration and corrosion are exacerbated at high temperature.

There are two known types of pipe structures for transporting petroleum effluents.

In rigid structures, the pipe may comprise a metal tube protected by an interior polymer layer for the purpose of enhancing the corrosion resistance. The interior polymer layer may take the form of a liner or of an adhesive coating, obtained by powder coating, for example.

Flexible structures may comprise—from the inside to the outside of the pipe—a metal carcass composed of metal strips wound helically with a short pitch so as to resist crushing, an extruded polymer layer acting as a sealing sheath, a vault of fastened metal wires to resist the internal pressure, a second extruded polymer layer as a sealing sheath, one or more tensile armor plies composed of metal wires wound helically at specific angles, and, lastly, an external polymer sheath serving to protect the pipe from its surroundings. These structures are referred to as "rough bore" pipes.

Where the carcass is omitted in such pipes, they are referred to as "smooth bore" pipes. In these latter structures, the petroleum effluents are in direct contact with the polymer of the sealing layer.

To enhance the temperature resistance of these pipes, document US 2006/0229395 A1 proposes the use of interior coatings or conduits extruded from thermoplastic polymers which have a high resistance to chemical products and a high softening point, such as poly(phenylene sulfide)s (PPS) or polyaryletherketones (PAEK). The document makes no mention of the gas permeability of these polymers.

Document WO 2014/199033 proposes the addition to the polymer of alkali metal or alkaline earth metal oxides, for neutralizing the $CO_2$ and the $H_2S$ by chemical reaction. The polymers proposed are those from the class of vinylidene fluoride copolymers. This approach, however, presents difficulties with implementation, and the addition of fillers tends to detract from the mechanical properties of the polymers, especially the elongation at break.

Furthermore, patent application WO 2012/107753 A1 proposes reducing the risk of failure of a pipe for transporting fluids under pressure by reducing the residual stress therein, by carrying out slower and therefore more uniform crystallization of the polymer. Among the polymers considered, there is a mention of PEKK, although the latter is not exemplified. Nor does this document mention the gas permeability of these polymers.

In spite of this progress, there remains a need for pipes which have a low gas permeability, especially to corrosive species such as $CO_2$ and $H_2S$, even under extreme operating conditions. The reason is that a polymer exhibiting greater permeability performance would allow an increase in the lifetime of the pipes and/or a reduction in the thickness of the barrier layer and hence in the weight of the pipe.

SUMMARY OF THE INVENTION

The present invention rests on the finding that poly (etherketoneketone) (PEKK) exhibits very advantageous gas barrier properties, especially in relation to $CO_2$ and $H_2S$, these properties, more particularly, being markedly superior to those of poly(etheretherketone) (PEEK).

In a first aspect, the invention provides for the use of PEKK for lowering the $CO_2$ and $H_2S$ permeability of a part intended to enter into contact—directly or indirectly— with a petroleum effluent.

The term "part in contact with a petroleum effluent" denotes a layer in direct or indirect contact with said effluent.

The term "part in direct contact with a petroleum effluent" denotes especially an inner layer of a pipe.

The term "part in indirect contact with a petroleum effluent" denotes especially a layer which is not the inner layer but is placed around an inner layer, where said inner layer may be leaktight or not.

The PEKK preferably has a degree of crystallinity by mass of greater than 5%.

The PEKK advantageously has a ratio T:I of 35% to 100%, preferably of 55% to 85% and more specifically of 60% to 80%.

The $CO_2$ permeability of the part at 130° C. is preferably less than $10^{-8}$ cm$^3$ of $CO_2$ for a thickness of 1 cm and a surface area of 1 cm$^2$, per second and per bar of $CO_2$ pressure, the permeated amount of $CO_2$ being measured by GC.

The $H_2S$ permeability of the part at 130° C. is preferably less than $10^{-8}$ cm$^3$ for a thickness of 1 cm and a surface area of 1 cm$^2$, per second and per bar of $H_2S$ pressure, the permeated $H_2S$ amount of $H_2S$ being measured by GC.

The part is preferably selected from a tube, a sheath or pressure layer and an interior coating, especially intended for transporting a petroleum effluent.

In a second aspect, the invention provides for a pipe, especially for transporting a petroleum effluent, comprising a layer intended to be in contact with the petroleum effluent, characterized in that said layer intended to be in contact with the petroleum effluent comprises PEKK and has a $CO_2$ permeability at 130° C. of less than $10^{-8}$ cm$^3$ for a thickness of 1 cm and a surface area of 1 cm$^2$, per second and per bar of $CO_2$ pressure, and/or an $H_2S$ permeability at 130° C. of less than $10^{-8}$ cm$^3$ for a thickness of 1 cm and a surface area of 1 cm$^2$, per second and per bar of $H_2S$ pressure, the permeated amount of $CO_2$ and $H_2S$ being measured by GC, respectively.

In one embodiment, said layer intended to be in contact with the petroleum effluent is a sealing sheath surrounding a metal carcass.

In another embodiment, said layer intended to be in contact with the petroleum effluent is devoid of reinforcing fibers.

Said layer intended to be in contact with the petroleum effluent is preferably surrounded by at least one mechanical reinforcement layer.

In one embodiment, the at least one mechanical reinforcement layer is made of metal.

In another embodiment, the at least one mechanical reinforcement layer is made of composite material. In that case, the composite material may be, for example, a thermoplastic composite, especially based on polyamide, polyethylene, especially PE-RT (acronym for "polyethylene of raised temperature"), PEKK or PVDF, and may further comprise carbon fibers, especially continuous carbon fibers, aramid fibers or else glass fibers.

In one embodiment, the pipe of the invention further comprises a flexible metallic armature. In another embodiment, the pipe further comprises a rigid metallic armature.

In a third aspect, the invention provides, moreover, for a number of methods for manufacturing a pipe according to the invention.

When the pipe to be manufactured, especially renovated, is a rigid pipe, the method of the invention comprises the steps of:
(a) preparing a tube comprising PEKK of appropriate size; and
(b) inserting said tube inside a metal tube to form a liner.

When the pipe to be manufactured is a flexible rough bore pipe, the method of the invention comprises the steps of:
(a) providing a metal carcass;
(b) extruding around said metal carcass at least one layer of a composition comprising PEKK, by crosshead extrusion; and
(c) installing a vault around the resulting structure;
(d) installing one or more tensile armor plies; and
(e) extruding an external polymer sheath around the resulting assembly.

When the pipe to be manufactured is a flexible smooth bore pipe, the method of the invention comprises the steps of:
(a) extruding at least one layer of a composition comprising PEKK, by crosshead extrusion; and
(b) installing a vault around the resulting structure;
(c) installing one or more tensile armor plies; and
(d) extruding an external polymer sheath around the resulting assembly.

Other characteristics and advantages of the method according to the invention will emerge from reading the detailed description given hereinafter.

DETAILED DESCRIPTION OF THE INVENTION

According to the invention, the proposal is to use poly(etherketoneketone) (PEKK) for manufacturing parts which have a low gas permeability, and particularly with respect to $CO_2$ and/or $H_2S$.

PEKK

"PEKK" refers to PAEK polymers which comprise units of formulae (—Ar—X—) and also units of formula (—Ar—Y—), in which:
Ar and Ar' each denote a divalent aromatic radical;
Ar and Ar' may be selected, preferably, from optionally substituted 1,3-phenylene and 1,4-phenylene;
X denotes a carbonyl group;
Y denotes a group selected from an oxygen atom.

The poly-ether-ketone-ketone (PEKK) comprises a succession of repeating units of type —($Ar_1$—O—$Ar_2$—CO—$Ar_3$—CO)$_n$—, with each $Ar_1$, $Ar_2$ and $Ar_3$ representing independently a divalent aromatic radical, preferably a phenylene.

In the above formula, just as in all of the formulae which follow, n represents an integer.

The bonds on either side of each unit $Ar_1$, $Ar_2$ and $Ar_3$ may be of para or meta or ortho type (preferably of para or meta type).

In certain embodiments, the PEKK comprises a succession of repeating units of formula (IA) and/or of formula (IB) below:

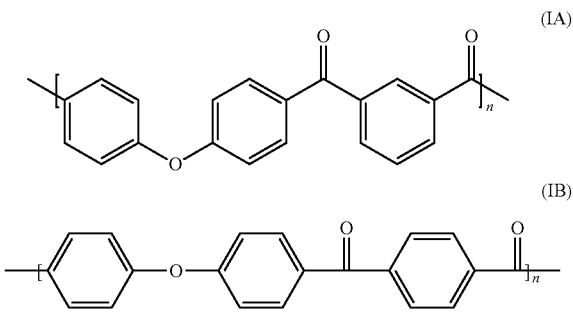

The units of formula (IA) are units derived from isophthalic acid (or I units), whereas the units of formula (IB) are units derived from terephthalic acid (or T units).

In the PEKK used in the invention, the proportion by mass of T units, relative to the sum of the T and I units, may range from 0% to 5%; or from 5% to 10%; or from 10% to 15%; or from 15% to 20%; or from 15% to 20%; or from 20% to 25%; or from 25% to 30%; or from 30% to 35%; or from 35% to 40%; or from 40% to 45%; or from 45% to 50%; or from 50% to 55%; or from 55% to 60%; or from 60% to 65%; or from 65% to 70%; or from 70% to 75%; or from 75% to 80%; or from 80% to 85%; or from 85% to 90%; or from 90% to 95%; or from 95% to 100%.

Ranges of from 35% to 100%, notably from 55% to 85% and even more specifically from 60% to 80% are particularly suitable. In all the ranges set out in the present patent application, the limits are included, unless otherwise mentioned.

The PEKK preferably has an intrinsic viscosity of 0.4 to 1.5 dL/g, preferably from 0.6 to 1.4 dL/g, more preferably from 0.8 to 1.2 dL/g, in 96% sulfuric acid.

The degree of crystallinity of a polymer may affect the gas permeability properties. Indeed, it has been noted that the gas permeability of PEKK, especially with respect to $CO_2$ and $H_2S$, goes down as the crystallinity increases. It is therefore preferable for the PEKK used to have a maximum degree of crystallinity, preferably of greater than 5%, particularly of greater than 15% and very particularly of greater than 25%. In the PEKK used in the invention, the proportion by mass of crystalline PEKK may in particular vary from 0% to 1%; or from 1% to 5%; or from 5% to 10%; or from 10% to 15%; or from 15% to 20%; or from 20% to 25%; or from 25% to 30%; or from 30% to 35%; or from 35% to 40%; or from 40% to 45%; or from 45% to 50%.

For certain applications, it may be advantageous to use amorphous PEKK. Amorphous PEKK denotes a PEKK with an enthalpy of fusion of less than 10 J/g as measured by DSC in accordance with the standard ISO 11357-3:1999.

The degree of crystallinity may be measured by WAXS. By way of example, the analysis can be carried out by wide-angle X-ray scattering (WAXS), on a device of Nano-inXider® type, with the following conditions:

Wavelength: main Kα1 line of copper (1.54 angstroms).
Generator power: 50 kV-0.6 mA.
Observation mode: transmission
Counting time: 10 minutes.

A spectrum of the scattered intensity as a function of the diffraction angle is thus obtained. This spectrum makes it possible to identify the presence of crystals, when peaks are visible on the spectrum in addition to the amorphous halo.

In the spectrum, it is possible to measure the area of the crystalline peaks (designated AC) and the area of the amorphous halo (designated AH). The proportion by mass of crystalline PEKK in the PEKK is then estimated using the ratio (AC)/(AC+AH).

It is usually advantageous for the content of crystalline PEKK to be relatively high, for example greater than or equal to 5%, or greater than or equal to 10%, or even greater than or equal to 15%, to provide parts having high mechanical performance. A further advantage of a high degree of crystallinity is better mechanical properties, including those at high temperature, in terms, for example, of modulus or of yield stress.

An alternative possibility is to calculate the degree of crystallinity from the enthalpy of fusion of the PEKK, measured for example by DSC, by dividing it by the enthalpy of fusion of a PEKK having a degree of crystallinity by mass of 100%.

The PEKK resin may comprise one or more additional polymers belonging or not to the class of PAEKs.

The content by mass of PEKK in the PEKK resin is preferably greater than or equal to 50%, preferably greater than or equal to 60%, particularly greater than or equal to 70%, preferably greater than or equal to 80%, and more preferably greater than or equal to 90%. In certain embodiments, the PEKK resin consists essentially of one or more PEKKs.

The resin may comprise additives such as fillers and functional additives. Accordingly, the resin may comprise reinforcing fillers, especially continuous fibers, particularly carbon fibers. It is also possible to dispense with fillers and/or to dispense with functional additives.

The resin may particularly comprise one or more phosphates or phosphate salts, to improve the melt stability of the PAEK.

According to the invention, the parts manufactured using PEKK have a low gas permeability, especially with respect to $CO_2$ and/or $H_2S$. In certain applications, such as, especially, underwater petroleum extraction, pipes are needed which are resistant and which maintain these properties under severe or even extreme operating conditions, so as to limit the migration of the gaseous species and to limit corrosion. These conditions typically include an operating temperature of more than 100° C., preferably more than 110° C., particularly more than 120° C. and very particularly more than 130° C. and/or a pressure of more than 10 bar, preferably more than 20 bar, particularly more than 30 bar and very particularly more than 40 bar, or even more than 50 or even more than 100 bar.

The part advantageously has a $CO_2$ permeability at 130° C. of less than $10·10^{-8}$, particularly $5·10^{-8}$, especially $1·10^{-8}$, preferably $5·10^{-9}$ and particularly less than $1·10^{-9}$ cm$^3$ of $CO_2$ for a thickness of 1 cm and a surface area of 1 cm$^2$, per second and per bar of $CO_2$ pressure, the amount of $CO_2$ being measured by GC.

Moreover, the $H_2S$ permeability of the part at 130° C. is preferably less than $10·10^{-8}$, particularly $5·10^{-8}$, especially $1·10^{-8}$, advantageously $5·10^{-9}$, more preferably less than $1·10^{-9}$, particularly less than $5·10^{-10}$ and very particularly less than $1·10^{-10}$ cm$^3$ of $H_2S$ for a thickness of 1 cm and a surface area of 1 cm$^2$, per second and per bar of $H_2S$ pressure, the amount of $H_2S$ being measured by GC.

In one embodiment, the part may comprise two or more layers. It may in particular combine at least one layer comprising PEKK with at least one layer of a different material, especially of PVDF, of polyamide, of polyethylene, especially of PE-RT, or else of material acting as a binder for assembling the respective layers to one another.

Pipes

In certain technical sectors, especially in petroleum extraction, materials are sought which combine temperature resistance and resistance to chemical products with a low gas permeability, especially with respect to the acidic compounds $CO_2$ and $H_2S$. The reason is that these compounds, present in the petroleum, are acidic and give rise to corrosion of metallic components. The use of PEKK is therefore especially advantageous for the manufacture of parts used in transporting liquid and/or gaseous hydrocarbons, referred to hereinafter as petroleum effluents.

In a second aspect, therefore, the invention pertains to a pipe comprising a layer intended to be in contact with the petroleum effluent, characterized in that said layer intended to be in contact with the petroleum effluent comprises PEKK and has a $CO_2$ permeability at 130° C. of less than $10^{-8}$ cm$^3$ of $CO_2$ for a thickness of 1 cm and a surface area of 1 cm$^2$, per second and per bar of $CO_2$ pressure, and/or an $H_2S$ permeability at 130° C. preferably of less than $10·10^{-8}$, particularly $5·10^{-8}$, especially $1·10^{-8}$, advantageously $5·10^{-9}$, more preferably $1·10^{-9}$, particularly $5·10^{-10}$ and very particularly $1·10^{-10}$ cm$^3$ of $H_2S$ for a thickness of 1 cm and a surface area of 1 cm$^2$, per second and per bar of $H_2S$ pressure, the amount of $CO_2$ and $H_2S$ being measured by GC.

These pipes may be useful in extraction facilities, for transporting a petroleum effluent, or else for transporting other mixtures comprising $CO_2$ and/or $H_2S$ under severe pressure and/or temperature conditions.

Provided in particular are pipes intended for transporting hydrocarbons, especially mixtures comprising at least one gaseous acidic compound, especially a gas selected from $CO_2$ and $H_2S$.

These pipes may have various structures, according to their specific usage and the associated stresses.

Therefore, the pipes may for example be single-layer pipes or else may comprise two, three, four or, indeed, an even greater number of layers. Multiple-layer pipes are enabled in particular to withstand the mechanical or thermal stresses at exterior layers which are not in contact with the petroleum effluents.

Generally, the layer intended to be in contact with the petroleum effluent constitutes the interior layer of the pipe. Nevertheless, the invention also encompasses the case in which this layer is in indirect contact with the petroleum effluents. In one embodiment of the invention, therefore, the pipe comprises a leaktight or nonleaktight interior layer, for example a metal carcass, which is surrounded by a layer comprising PEKK. In this case, the petroleum effluent passes at least partially through the nonleaktight interior layer, and therefore enters indirectly into contact with the layer comprising PEKK.

In one embodiment, the carcass is surrounded by a membrane comprising PEKK. In another embodiment, the membrane is composed of a plurality of layers, and comprises at least one additional layer to a layer comprising PEKK, made of a different polymer, such as for example of PVDF, of polyamide, of polyethylene, especially of PE-RT, or else of material acting as a binder for assembling the respective layers to one another.

Said multilayer membrane may for example comprise a layer comprising PEKK and a layer based on PVDF. PVDF is a material which is valued especially for its flexibility and its chemical resistance and thermal resistance (up to 280° C.), although its gas permeability means that it offers little protection from corrosion. Advantageously, the PVDF layer may be disposed in contact with the carcass, and the layer comprising PEKK may be disposed on the exterior of the carcass. Other layers may be disposed between these two layers forming the membrane.

The layers making up the membrane may be bonded to each other for example by mechanical fastening, in other words by engagement of roughnesses present on their respective surfaces.

Hence the pipe may be of the type referred to as "rough bore". In this type of pipe, the layer intended to be in contact with the petroleum effluent may constitute a sealing sheath surrounding a metal carcass. The carcass is formed by a metal strip wound helicoidally, which serves to enhance the resistance of the pipe with respect to external pressure. Pipes of this kind may further comprise a vault, made for example of fastened metal wires, to ensure resistance to the internal pressure within the pipe, and tensile armor plies composed of metal wires wound helically at a specified angle, allowing the pipe in particular to possess better tensile strength.

The pipe may alternatively be of the type referred to as "smooth bore". This type of pipe has no metal carcass. The petroleum effluent may then be in direct contact with the layer comprising PEKK. In both types of pipe, the layer intended to be in contact with the petroleum effluent may or may not contain reinforcing fibers. In any case, as well as the low gas permeability, especially with respect to $CO_2$ and $H_2S$, an advantage of the PEKK is an excellent abrasion resistance, especially if it is formulated with other agents, particularly reinforcing fibers, especially carbon fibers. Accordingly, an interior layer of PEKK provides effective resistance to abrasion caused by solid particles, which are often present in the effluents.

The pipes according to the invention typically further comprise—as explained earlier on for the rough bore pipes—at least one mechanical reinforcement layer, forming armature, in order to resist the exterior and interior pressure. There are, however, also flexible pipes composed exclusively of thermoplastic polymers, such as those sold by Airborne. In these pipes, the reinforcement layers and optional metallic armatures are replaced by reinforcements composed of thermoplastic composites.

The at least one mechanical reinforcement layer may be made of metal. In this case, it may be a metal tube or else, for greater flexibility, may be a winding of metal wires or of metal fabric.

The mechanical reinforcement layer may alternatively be made of composite material. The composite material is preferably composed of a polymer reinforced with reinforcing fillers. The polymer is preferably a high-performance thermoplastic polymer, for example a polymer from the class of polyamides, polyethylene, especially PE-RT, PVDF, PAEKs, especially selected from PEKK and/or PEEK. In the composite, the polymer is reinforced with reinforcing fillers, especially fibers, especially carbon fibers or aramid fibers or glass fibers. A mechanical reinforcement layer of this kind comprising PEKK may, furthermore, replace both the metal carcass and the vault, where appropriate, to give a flexible, smooth bore pipe.

In one embodiment, the pipe further comprises a flexible exterior armature. In another embodiment, the pipe further comprises a rigid exterior armature.

The layer intended to be in contact with the petroleum effluent may especially be present in the form of a tube, a sheath or a pressure layer or else an interior coating. The interior coating may particularly be a liner intended for insertion into pipes, especially metal pipes, in order to renovate them.

In a third aspect, the invention provides for a method for manufacturing pipes as described above.

Particularly, when the layer intended to be in contact with the petroleum effluent takes the form of a tube or sheath, it may be obtained, for example, by extrusion or coextrusion. When the layer is in the form of an interior coating, it may be obtained, for example, by powder coating.

A part composed of a plurality of layers, as described above, may also be obtained by sheathing extrusion or else by winding of strips and subsequent welding. In this case, the layer intended to be in contact with the petroleum effluent is also designated as pressure layer or sheath.

More specifically, when the pipe to be manufactured or renovated is a rigid pipe, the method of the invention comprises the steps of:
(a) preparing a tube comprising PEKK of appropriate size; and
(b) inserting said tube inside a metal tube to form a liner.

In one embodiment, the tube comprising PEKK may further comprise one or more additional layers, for example of PVDF, of polyamide, of PE-RT or else of material acting as a binder for assembling the respective layers to one another.

When the pipe to be manufactured is a flexible rough bore pipe, the method of the invention comprises the steps of:
(a) providing a metal carcass;
(b) extruding around said metal carcass at least one layer of a composition comprising PEKK, by crosshead extrusion; and
(c) installing a vault around the resulting structure;
(d) installing one or more tensile armor plies; and
(e) extruding an external polymer sheath around the resulting assembly.

It is possible before step (b) to extrude one or more other layers on the metal carcass, especially a layer based on PVDF, on polyamide, on polyethylene, especially on PE-RT, or else on material acting as a binder for assembling the respective layers to one another.

When the pipe to be manufactured is a flexible smooth bore pipe, the method of the invention comprises the steps of:
a) extruding at least one layer of a composition comprising PEKK, by crosshead extrusion; and
b) installing a vault around the resulting structure;
c) installing one or more tensile armor plies; and
d) extruding an external polymer sheath around the resulting assembly.

It is possible during step (a) to extrude one or more other layers, especially based on PVDF, on polyamide, on polyethylene, especially on PE-RT, or else on material acting as a binder for assembling the respective layers to one another.

The invention will be described in more detail in the nonlimiting examples below.

EXAMPLES

Example 1 PEKK Permeability

The permeability of the PEKK to gases, and especially to $CO_2$ and $H_2S$, plays a particularly large role in petroleum applications, and accordingly a plaque of PEKK (KEPSTAN® 7002, sold by ARKEMA France, ratio T:I=70:30) with dimensions of 100 mm×100 mm×2 mm was prepared by injection molding. A plaque of KEPSTAN® 8002 PEKK (sold by ARKEMA France, ratio T:I=80:20) with dimensions of 100 mm×100 mm×2 mm was also prepared, by strip extrusion followed by machining to the desired dimensions.

The crystallinity of the PEKK in the injection-molded plaque was characterized by measuring the enthalpy of fusion by differential scanning calorimetry (DSC). This was also carried out for the extruded plaque. From this it is possible to obtain, by comparison with the theoretical enthalpy of 100% crystallization, the degree of crystallinity of the PEKK in the injection-molded plaque and the extruded plaque.

The $CO_2$ permeability of the injection-molded plaque under severe conditions was then evaluated by placing disks machined from the plaque, with a diameter of 90 mm, into a heated permeation cell (T=130° C.). The same test was carried out for the extruded plaque, on disks 70 mm in diameter.

The permeation cell is supplied with a gas (presently $CO_2$) which enters at a specified pressure and comes into contact with one face of the plaque of the test material. The entry pressure of the gas (presently 40 bar) can be controlled by a compressor system. On the other side of the plaque, a carrier gas (presently nitrogen) carries the gas which is permeated through the plaque to a detector (presently a gas chromatograph (GC)), where it is quantified. The measured amount of permeated gas is used to calculate the permeability, taking account of the surface area of the plaque, the partial pressure difference in permeating gas, the measuring time, and the thickness of the plaque.

The permeability is calculated in steady state, following the transitory state, which reflects the time required by the permeating gas molecules to diffuse through the plaque. The steady state is considered to have been reached when the measured flow of $CO_2$ does not increase by more than 1% between two samplings at an interval of 24 h. As an example, in the case of the plaques studied, 10 days were needed in total to carry out the permeability measurement.

The results are collated in table 1 below.

The $H_2S$ permeability of the PEKK was evaluated as described above for $CO_2$, but using a Kepstan® 7002 plaque with a thickness of 0.5 mm (machined in the form of a disk 70 mm in diameter), instead of a 2 mm plaque, and under a pressure of 15 bar.

The results are collated in table 2 below.

Furthermore, amorphous films with a thickness of 50 µm were prepared by extrusion calendering from KEPSTAN® 7002 PEKK (sold by ARKEMA France, ratio T:I=70:30). These films were crystallized by heat treatment in an oven at 210° C. for 40 minutes. Disks 50 cm² in area were removed from these two films (amorphous and crystalline) and used for measuring the permeability to $CO_2$, $O_2$, $N_2$ and $CH_4$ gases. The measurements were carried out in a permeation cell as explained above, but at ambient temperature and atmospheric pressure.

The results are collated in table 3 below.

Example 2 (Comparative) PEEK Permeability

To compare the properties of PEKK with those of PEEK, example 1 was repeated, this time using an injection-molded plaque of PEEK with a thickness of 2 mm (450G, sold by VICTREX).

The $H_2S$ permeability of was evaluated as described above for $CO_2$, but using an injection-molded plaque of PEEK (450G, sold by VICTREX) with a thickness of 0.5 mm (machined subsequently in the form of 70 mm disks), under a pressure of 15 bar.

The results are collated in tables 1 and 2 below.

Furthermore, disks 70 mm in diameter were removed from 50 µm films of 450G PEEK implemented by extrusion calendering (amorphous extrudates and also extrudates crystallized at 205° C. for times of greater than 1 h), and were used for measuring the permeability to $CO_2$, $O_2$, $N_2$ and $CH_4$ gases. The measurements were carried out in a permeation cell as explained above, but at ambient temperature and atmospheric pressure.

The results are collated in table 3 below.

The results show that the $CO_2$ permeability of PEKK under severe temperature and pressure conditions is markedly superior to that of PEEK. This observation is all the more surprising because PEEK has a higher degree of crystallinity than PEKK. The reason is that the enthalpy of fusion of the PEEK plaque is greater than that of the PEKK plaque.

TABLE 1

$CO_2$ permeability

| Polymer | Enthalpy of fusion [J/g] | Temperature [° C.] | Pressure [bar] | Permeability [cm³/cm · s · bar] | Diffusion coefficient [cm²/s] |
| --- | --- | --- | --- | --- | --- |
| PEKK KEPSTAN® 7002 | 32 | 130 | 40 | $6.1 \cdot 10^{-9}$ | $3.6 \cdot 10^{-8}$ |
| PEKK KEPSTAN® 8002 | 39 | 130 | 40 | $7.5 \cdot 10^{-9}$ | $4.7 \cdot 10^{-8}$ |
| PEEK 450G | 46 | 130 | 40 | $15 \cdot 10^{-9}$ | $9.5 \cdot 10^{-8}$ |

With regard to the permeability for $H_2S$, a clear superiority is found in the same way for the PEKK by comparison with the PEEK, since the permeability of the PEKK is observed to be 2.8 times less than the permeability of the PEEK.

TABLE 2

$H_2S$ permeability

| Polymer | Temperature [° C.] | Pressure [bar] | Permeability [cm³/cm · s · bar] | Diffusion coefficient [cm²/s] |
| --- | --- | --- | --- | --- |
| PEKK* | 130 | 15 | $6.5 \cdot 10^{-9}$ | $8.0 \cdot 10^{-9}$ |
| PEEK* | 130 | 15 | $1.8 \cdot 10^{-8}$ | $2.0 \cdot 10^{-8}$ |

*measured on a plaque 0.5 mm thick

It is also found that the films made of crystallized PEKK are markedly better in barrier properties toward all of the test gases, as compared with the crystallized PEEK films. Similarly, the amorphous PEKK films are better in barrier properties as compared with the amorphous PEEK films.

Tests also reveal that PEKK, even in amorphous form, exhibits better barrier behavior toward the gases $CO_2$, $O_2$, $N_2$ and $CH_4$ than does crystallized PEEK.

TABLE 3

Permeability of PEKK and PEEK films

| Polymer | Crystallized/ amorphous | Permeability [cm³ · 50 μm/m² · 24 h · atm] | | | |
|---|---|---|---|---|---|
| | | $CO_2$ | $O_2$ | $N_2$ | $CH_4$ |
| PEKK KEPSTAN® 7002 | crystallized | 140 | 80 | 10 | 7 |
| PEEK 450G | crystallized | 840 | 180 | 30 | 20 |
| PEKK KEPSTAN® 7002 | amorphous | 645 | 170 | ND | 12 |
| PEEK 450G | amorphous | 1790 | 345 | ND | 40 |

These results show that at the same thickness, the use of PEKK in pipes for transporting petroleum effluents allows better protection of metal components from corrosion brought about by the migration of gases such as $CO_2$ and $H_2S$. Moreover, in order to reach a target permeability, it is possible by using PEKK to reduce the thickness of the sheaths and so to reduce the weight of the pipe.

The invention claimed is:

1. A method for lowering the $CO_2$ and $H_2S$ permeability of a part intended to be in contact with a petroleum effluent, the method comprising using PEKK for the part, wherein the PEKK has a degree of crystallinity by mass of greater than 5%.

2. A method for lowering the $CO_2$ and $H_2S$ permeability of a part intended to be in contact with a petroleum effluent, the method comprising using PEKK for the part, wherein the PEKK has a ratio T:I of 35% to 100%.

3. A method for lowering the $CO_2$ and $H_2S$ permeability of a part intended to be in contact with a petroleum effluent, the method comprising using PEKK for the part, wherein the $CO_2$ permeability at 130° C. is less than $10 \cdot 10^{-9}$ cm³ of $CO_2$ for a thickness of 1 cm and a surface area of 1 cm², per second and per bar of $CO_2$ pressure, and/or an $H_2S$ permeability at 130° C. is less than $10^{-8}$ cm³ for a thickness of 1 cm and a surface area of 1 cm², per second and per bar of $H_2S$ pressure, the amount of $CO_2$ and $H_2S$ being measured by GC, respectively.

4. The method as claimed in claim 1, wherein the part is selected from a tube, a sheath, a pressure layer and an interior coating.

5. A pipe for transporting a petroleum effluent, comprising a layer intended to be in contact with the petroleum effluent, wherein said layer intended to be in contact with the petroleum effluent comprises PEKK and has a $CO_2$ permeability at 130° C. of less than $10 \cdot 10^{-8}$ cm³ of $CO_2$ for a thickness of 1 cm and a surface area of 1 cm², per second and per bar of $CO_2$ pressure, and/or an $H_2S$ permeability at 130° C. of less than $10^{-8}$ cm³ for a thickness of 1 cm and a surface area of 1 cm², per second and per bar of $H_2S$ pressure, the amount of $CO_2$ and $H_2S$ being measured by GC, respectively.

6. The pipe as claimed in claim 5, wherein said layer intended to be in contact with the petroleum effluent is a sealing sheath surrounding a metal carcass.

7. The pipe as claimed in claim 5, wherein said layer intended to be in contact with the petroleum effluent is devoid of reinforcing fibers.

8. The pipe as claimed in claim 5, wherein said layer intended to be in contact with the petroleum effluent is surrounded by at least one mechanical reinforcement layer.

9. The pipe as claimed in claim 8, wherein the at least one mechanical reinforcement layer is made of metal.

10. The pipe as claimed in claim 8, wherein the at least one mechanical reinforcement layer is made of composite material.

11. The pipe as claimed in claim 10, wherein the composite material comprises PEKK and carbon fibers.

12. The pipe as claimed in claim 5, further comprising a rigid metal armature.

13. The pipe as claimed in claim 5, further comprising a flexible metal armature.

14. A method for manufacturing or renovating a pipe as claimed in claim 12, comprising the steps of:
   a. preparing a tube comprising PEKK of appropriate size; and
   b. inserting said tube inside a metal tube to form a liner.

15. A method for manufacturing a pipe as claimed in claim 13, comprising the steps of:
   a. providing a metal carcass;
   b. extruding around said metal carcass at least one layer of a composition comprising PEKK, by crosshead extrusion; and
   c. installing a vault around the resulting structure;
   d. installing one or more tensile armor plies; and
   e. extruding an external polymer sheath around the resulting assembly.

16. A method for manufacturing a pipe as claimed in claim 13, the method comprising the steps of:
   a. extruding at least one layer of a composition comprising PEKK by crosshead extrusion; and
   b. installing a vault around the resulting structure;
   c. installing one or more tensile armor plies; and
   d. extruding an external polymer sheath around the resulting assembly.

17. The method as claimed in claim 2, wherein the part is selected from a tube, a sheath, a pressure layer and an interior coating.

18. The method as claimed in claim 3, wherein the part is selected from a tube, a sheath, a pressure layer and an interior coating.

* * * * *